United States Patent
Alon et al.

(10) Patent No.: US 6,829,280 B2
(45) Date of Patent: Dec. 7, 2004

(54) DEVICE AND A METHOD FOR THE GENERATION OF COHERENT X-RAY RADIATION

(75) Inventors: Ofir Alon, Haifa (IL); Vitali Averbukh, Netanya (IL); Nimrod Moiseyev, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 31 days.

(21) Appl. No.: 10/275,807

(22) PCT Filed: May 10, 2001

(86) PCT No.: PCT/IL01/00414

§ 371 (c)(1),
(2), (4) Date: Jun. 9, 2003

(87) PCT Pub. No.: WO01/86763

PCT Pub. Date: Nov. 15, 2001

(65) Prior Publication Data

US 2004/0125828 A1 Jul. 1, 2004

Related U.S. Application Data

(60) Provisional application No. 60/203,485, filed on May 11, 2000.

(51) Int. Cl.[7] .................................................. H01S 3/09
(52) U.S. Cl. ............................ 372/69; 372/25; 372/5; 372/22; 372/27; 372/31; 372/32
(58) Field of Search ............................ 372/68, 27, 22, 372/5, 25, 31, 32

(56) References Cited

U.S. PATENT DOCUMENTS 6,097,740 A * 8/2000 Palathingal ..................... 372/5

FOREIGN PATENT DOCUMENTS

WO    WO99/33084    7/1999

OTHER PUBLICATIONS

High–Order Harmonics: A coherent source in the XUV range, L'Huillier et al; Journal of Nonlinear Optical Physics and Materials vol. 4 no, 3 (1995) 647–665 World Scientific Publishing Company 1995.

Crossed beam experiment: High Order Harmonic generation and dynamical symmetry Averbuch et al; Physical Review A vol. 60, no 3 Sep. 1999.

Stability and instability of dipole selection rules for atomic high–order–harmonic–generation spectra in two beam set-ups, Averbukh et al; Physical Review A vol. 65 2002.

(List continued on next page.)

*Primary Examiner*—Leon Scott, Jr.
(74) *Attorney, Agent, or Firm*—Mark M. Friedman

(57) ABSTRACT

A device (10) for producing high frequency radiation using a source of elliptically polarized radiation is disclosed based on: irradiating a frequency multiplication medium having a screw axis (16) symmetry of approximate Nth order symmetry, oriented so that said elliptically polarized radiation propagates in parallel to the screw axis (16). Also, a method for producing high frequency radiation is disclosed based on irradiating a frequency multiplication medium having a screw axis (16) of approximate Nth order symmetry with elliptically polarized radiation so that the elliptically polarized radiation propagates in parallel to the screw axis (16). Furthermore, a method of producing a beam of high frequency radiation composed of only a limited number of wavelengths is disclosed whereby the intensity of a beam (22) interacting with a frequency multiplication medium is selected so that only a limited number of wavelengths is emitted.

58 Claims, 3 Drawing Sheets

OTHER PUBLICATIONS

Selection Rules for the High Harmonic Generation Spectra Alon et al; Physical Review Letters vol. 80, no 17 pp 3743–3746 Apr. 1998.

High–Order Harmonic Generation by molecules of discrete rotational symmetry interacting with circularly polarized laser field, Averbukh et al, Physical Review A vol. 64 (2001)033411–1 033411–13.

Highly ordered carbon nanotube arrays for electronics applications Papadopoulos et al Applied Physics Letters, vol. 75 No. 3 Jul. 1999.

Nanotubes as nanoprobes in scanning probe microscopy Dai et al; Center for Nanoscale Science and Technology and Departments of Chemistry and Physics, Rice Univ, Houston Tx 77251 Nature vol. 384 Nov. 1996.

Novel Polygonized Single Wall Carbon Nanotube Bundles, Lopez et al; The American Physical Society, vol. 86 No. 14 Physical Review Letters pp 3056–3059.

X–Rays by Novel Carbon Nano– molecules, Moiseyev et al; Dept of Chemistry and Minerva Center for non Linear Physics Technion—Haifa Israel.

High Harmonic Generation of Soft X–Rays by Carbon Nanotubes, Alon et al; Physical Review Letters vol. 85, No. 24 Dec. 2000.

Carbon Nanotubes as Inverse Laser Catalysts Generation of Coherent High Energy Radiation up to Coherent Soft X–Ray; Alon et al; Dept of Chemistry and Minerva Center for non Linear Physics Technion—Haifa Israel.

Generation of Coherent Soft X Rays at 2.7nm Using High Harmonics, Chang et al; Phys Rev Lett 79 #16, pp2967–2970 (1997).

Coherent 0.5–keV X–Ray Emission from Helium Driven by a Sub–10–fs Laser, Schnurer et al, Phys Rev Lett vol. 80 #15, pp3236–3239 (1998).

Coherent soft x–ray generation by the harmonics of an ultrahigh–power KrF laser, Sarukura et al, Phys Rev Lett vol. 43 #3, pp1669–1672 (1991).

High–order harmonics of 248.6–nm KrF laser form helium and neon ions, Preston et al, Phys Rev Lett vol. 53 #1, pp R31–R34 (1996).

Aligned Carbon Nanotube Films: Production and optical and Electronic Properties: Science vol. 268;pp845–847 May 1995.

Self–Oriented Regular Arrays of Carbon Nanotubes and Their Field Emission Properties; Fan et al Science vol. 283, pp512–514 (Jan. 1999).

Crystalline Ropes of Metallic Carbon Nanotubes; Thess et al Science vol. 273 pp 483–487 (Jul. 1996).

Electronic structure of atomically resolved carbon nanotubes; Wilder et al; Nature vol. 391 pp59–62 (Jan. 1998).

Synthesis of Macroscopically Long Ropes of Well–Aligned Single–Walled Carbon Nanotubes; Liu et al; Advanced Materials; vol. 12, pp 1190–1192 (Aug. 2000).

Novel Polygonized Single–Wall Carbon Nanotube Bundles; Lopez et al; Phys Rev Lett 86 #14, pp3056–3059 (2001).

Carbon nanotubes synthesised in channels of AlPO4–5 single crystals : first X–Ray scattering investigations; Launois et al; Solid State Comm. vol. 116, pp99–103 (2000).

* cited by examiner

DEVICE AND A METHOD FOR THE GENERATION OF COHERENT X-RAY RADIATION

This application claims the benefit of Provisional Application No. 60/203,485 filed May 11, 2000.

FIELD AND BACKGROUND OF THE INVENTION

The present invention relates to the generation of high frequency coherent electromagnetic radiation such as soft x-rays and, more particularly, to a device and method for producing a beam of this radiation.

The development of masers and lasers circa 1960 stimulated speculation about the possibility to develop devices that generate coherent electromagnetic radiation with much shorter wavelengths, for example, of soft x-ray wavelengths between about 1 nm and about 10 nm. Such devices could be used in applications including holographic imagine of biological structures, plasma diagnostics and the generation of intense plasmas. More recent advances in other fields have suggested other applications of coherent soft x-rays. For example, a source of coherent x-rays for CT scanning could be operated at a much lower power level than the sources of incoherent x-rays now in use, reducing the exposure of the subjects to ionizing radiation. Another application is in the fabrication of microdevices. The design rule of devices such as integrated circuits is now limited to a lower bound of about 0.1 microns by several factors, not least of which is that the shortest wavelength radiation that can be used for photolithography is ultraviolet radiation. A coherent source of soft x-rays would help make even shorter design rules feasible. Similarly, a coherent source of soft x-rays would enable much denser storage of information in media such as compact disks. A sufficiently intense coherent beam of soft x-rays can be used as an industrial cutting tool.

Lasers have been used to produce soft x-rays. The first soft x-ray laser was developed at Lawrence Livermore National Laboratory in 1984. This device, which was described in general terms by Dennis Matthews and Mordecai Rosen in the December 1988 issue of *Scientific American*, uses the Nova laser to create a plasma including high-Z ions and to create a population inversion among those ions by collisional excitation. The laser medium in such a device is inherently transient. Essentially, the mere process of creating the laser medium, by evaporating a metal foil to produce plasma, also destroys the laser medium. The use of the Nova laser, originally developed for controlled fusion research, to create the lacer medium also meant that the device was a large, expensive research tool unsuitable for practical applications. More compact soft x-ray lasers have been developed in recent years, but like their giant ancestor at LLNL, they all rely on inherently self-destructive mechanisms to create a population inversion in a highly ionized plasma.

Two non-self-destructive strategies for the generation of coherent soft x-rays have been explored. The first is the imposition of spatial periodicity on the trajectories of high-energy electrons in free-electron lasers. This requires the use of a massive high-energy accelerator to create the high-energy electrons.

The second non-self-destructive strategy for the generation of coherent soft x-rays is the use of frequency multiplication media to create higher harmonics of coherent light. This strategy has led to the development of devices that produces high frequency coherent electromagnetic beams from low frequency coherent electromagnetic beams produced by conventional lasers. A review of the strategy may be found in L'Huiller et al., "High-order harmonics: a coherent source in the XUV range", *Journal of Nonlinear Optical Physics and Materials*, July 1995, Vol. 4 No. 3, pp. 647–665, which is incorporated by reference for all purposes as if fully set forth herein.

Using helium atoms as the frequency multiplication medium, Chang et al. in *Phys. Rev. Lett.* 79, pp. 2967–2970 (1997) have reported the generation of beams with down to 2.7 nm wavelengths while Schnürer et al. in *Phys. Rev. Lett.* 80, pp. 3236–3239 (1998) have reported the generation of beams with wavelengths down to shorter than 2.5 nm.

WO 99/33084, which is incorporated by reference for all purposes as if fully set forth herein, discloses a device where a substantially circularly polarized beam of coherent light is directed at a frequency multiplication medium. The frequency multiplication medium of WO 99/33084 is made up of a material, having constituents, the constituents having an approximate Nth order rotational symmetry axis, oriented so that the Nth order axes of the constituents are substantially parallel to the incident beam. The interaction of the beam and the constituents produces selected higher frequency harmonics of the frequency of the incident beam. If the Nth order rotational symmetry axis is exact, the harmonic frequencies produced are integral multiples of the frequency of the harmonic beam, given by $\Omega=Nk\pm1$, where k is a positive integer. If the Nth order rotational axis symmetry is only approximate, the harmonics are centered around these multiples. "Approximate Nth order rotational symmetry axis" means that the geometry of the constituents of the frequency multiplication medium is close enough to having an exact Nth order rotational symmetry axis for the interaction of the frequency multiplication medium with the incident beam to lead to frequency multiplication in accordance with the approximate selection rules. Depending on N and on the frequency of the incident beam, the harmonics produced are up into the soft x-ray band. Suitable medium constituents include molecules with a dipole and $C_5$ symmetry (such as $C_5H_5Tl$ gas) circular rings of nanoparticles and nanotubes.

The methods and devices known in the art are insufficient because ordinarily N is not very large, generally N=2 for atoms in monochromatic linearly polarized fields, leading to the emission of many harmonics and thus a broad mixture of wavelengths. For example, N. Sarukura et al. reported in *Phys. Rev. A* Vol 43 pp. 1669–1672 (1991) the generation of $9^{th}$ to $23^{rd}$ order harmonics of light from a KrF laser when using helium as a frequency multiplication medium. Preston et al in *Phys. Rev. A* Vol. 53 pp. R31–R34 (1996) reported obtaining harmonics up to the $35^{th}$ using helium as a frequency multiplication medium.

As is clear to one skilled in the art, for most applications it is preferred that the distribution of wavelengths in the produced beam be as limited as possible.

There is thus a widely recognized need for, and it would be highly advantageous to have, a compact, portable, reusable source of coherent x-rays with a limited wavelength distribution.

SUMMARY OF THE INVENTION

According to the present invention there is provided a device for producing high frequency radiation, including: a) a source of elliptically polarized radiation; and b) a frequency multiplication medium including at least one constituent having approximate finite symmetry including a screw axis of approximate Nth order symmetry, wherein N is at least 2, and wherein the constituent is oriented so that the radiation propagates substantially parallel to the screw axis.

According to the present invention there is also provided a method of producing high frequency radiation, including the steps of: a) providing a frequency multiplication medium including at least one constituent having approximate finite symmetry including a screw axis of approximate Nth order symmetry, wherein N is at least 2; and b) directing elliptically polarized radiation at an angle to the screw axis so that the elliptically polarized radiation propagates substantially parallel to the screw axis According to the present invention there is provided a device for producing high frequency radiation, including: a) a source of elliptically polarized radiation; and b) a frequency multiplication medium including at least one constituent having approximate finite symmetry including a screw axis of approximate Nth order symmetry, wherein N is at least 2 and also including an axis of approximate $C_n$ symmetry, wherein n is at least 3, and wherein the constituent is oriented so that the radiation propagates substantially parallel to the screw axis.

According to the present invention there is also provided a method of producing high frequency radiation, including the steps of: a) providing a frequency multiplication medium including at least one constituent having approximate finite symmetry including a screw axis of approximate Nth order symmetry, wherein N is at least 2 and also including an axis of approximate $C_n$ symmetry, wherein n is at least 3; and b) directing elliptically polarized radiation at an angle to the screw axis so that the elliptically polarized radiation propagates substantially parallel to the screw axis.

According to the present invention there is also provided a method of producing a beam of high frequency radiation composed of a limited number of wavelengths by: a) providing a frequency multiplication medium including at least one constituent having approximate finite symmetry including a screw axis of approximate Nth order symmetry, wherein N is at least 2; and b) directing elliptically polarized radiation at an angle to the axis such that the elliptically polarized radiation propagates substantially parallel to the screw axis. The intensity of the radiation is chosen relative to the frequency of the radiation, the magnitude of N and the geometry of the constituent so that only the desired number of harmonics is produced.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a device and method for the production of coherent circularly polarized light. Specifically, the present invention is used to produce coherent soft x-rays. The principles and operation of the device and the method of the present invention may be better understood with reference to the drawings and the accompanying description.

According to the method of the present invention, selected higher harmonics of a beam of elliptically polarized electromagnetic radiation are generated by the interaction of the beam with a constituent of a frequency multiplication medium having a screw axis of approximate Nth order symmetry. The interaction causes selected higher frequency harmonics of the incident beam to be emitted from the medium. The selection rule for high harmonic generation is L=pN±1, where L is a generated harmonic, p a positive integer and N the order of the screw axis. Generated are pairs of harmonics. The theoretical background of how this interaction generates a beam of selected higher harmonics of the incident beam is described in the Appendix and in Alon et al., "High Harmonic Generation of Soft X-Rays by Carbon Nanotubes". *Phys. Rev. Lett.*, Vol. 85 pp. 5218–5221 (Dec. 11, 2000).

According to the Appendix and in Alon et al., conditions for selective high harmonic generation include: the screw axis of the constituent of the frequency multiplication medium having an Nth order, the incident beam being circularly polarized and the incident beam propagating in parallel to the screw axis. As can be experimentally proven by one skilled in the art, any of these three conditions can be relaxed to a certain extend without substantially effecting the selectivity of high harmonic generation. Thus, for practical purposes, the screw axis of the constituent of a used frequency multiplication medium has an approximate Nth order, the incident beam may be elliptically polarized, and the beam must propagate only substantially parallel to screw axis.

A most basic embodiment of a device of the present invention consists of a beam of coherent elliptically polarized radiation directed at a frequency multiplication medium with a constituent having a screw axis symmetry of approximate Nth order, where the beam propagates substantially parallel to the screw axis.

Nanotubes are a preferred class of materials for implementing a device of the present invention. Nanotubes are cylindrical molecules, typically composed of carbon, although nanotubes made of other compositions such as boron-nitride, tungsten disulfide or molybdenum disulfide are also known. For the purposes of the present discussion, the case of single walled pure carbon nanotubes will be considered as non-limiting example.

Figure 1:
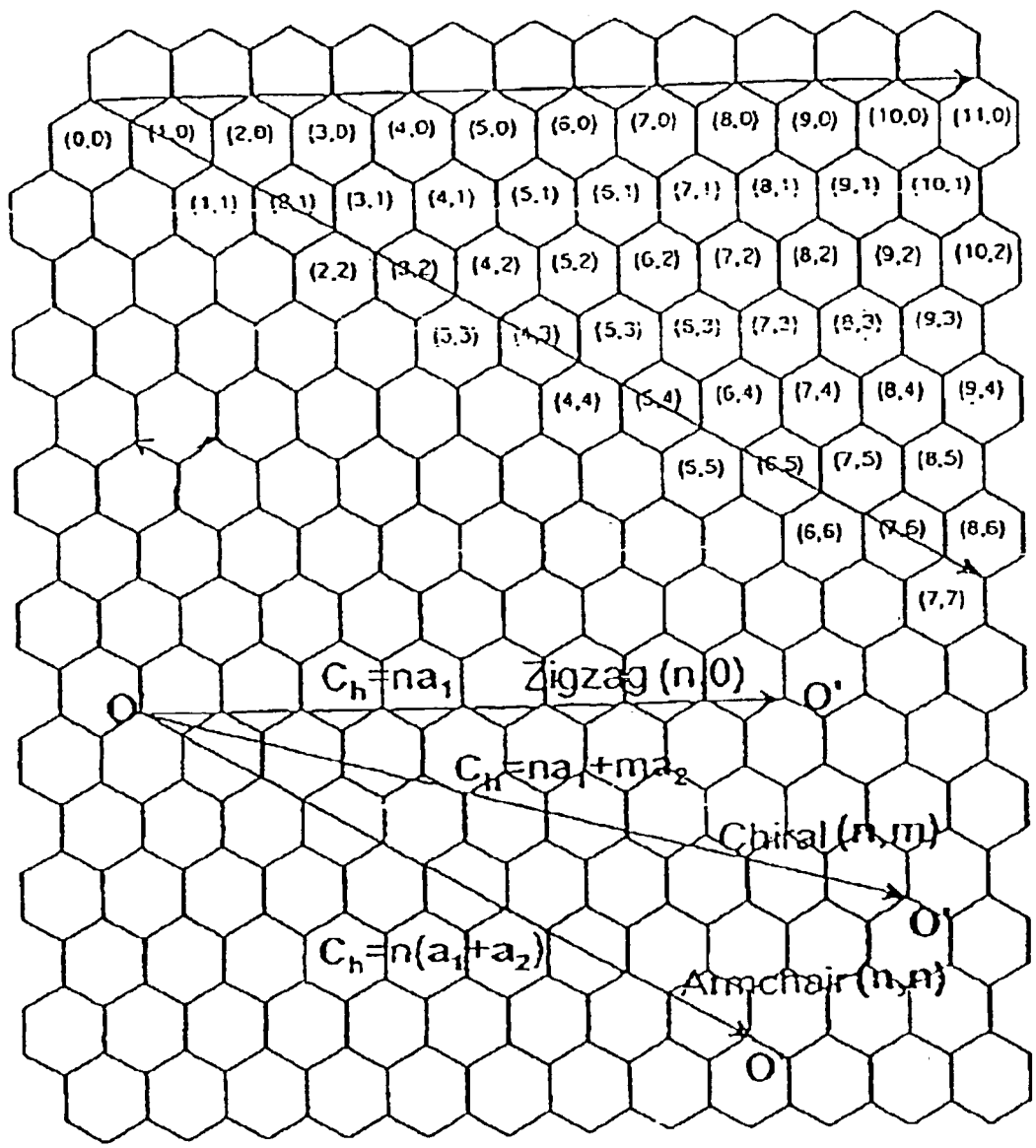
FIG. 1 illustrates the classification of carbon, boron-nitride, tungsten disulfide, or molybdenum disulfide nanotubes according to the pair of indices (n, m)

Single walled carbon nanotubes can be viewed as graphite sheets rolled up into cylindrical structures. The infinite order of translational symmetries of the graphite lattice transforms into various finite order symmetries once the graphite sheet is rolled-up to make a nanotube. The order and character of the resulting symmetries depend on the way the graphite sheet boundaries are connected with each other to form the nanotube cylinder. In FIG. 1, the accepted classification of carbon nanotubes, according to the pair of indices (n,m), is illustrated. A (n,m)-carbon nanotube is formed by rolling the graphite sheet along the chiral vector $C_h = n\bar{a}_1 + m\bar{a}_2$, such that its origin O and its end point O' coincide in the nanotube. If the graphite sheet is rolled along the $n\bar{a}_1$ direction then a zigzag nanotube classified by the pair of indices (n,0) is formed. If the graphite sheet is rolled along the $n(\bar{a}_1+\bar{a}_2)$ direction then all armchair nanotube classified by the pair of indices (n,n) is formed. In all other cases, that is whenever 0<m<n, a chiral nanotube is formed.

For example, when a (12,6)-carbon nanotube having a screw axis with the order N=84 is irradiated in accordance with the method of the present invention with a beam with a wavelength of 248 nm and an intensity in the range of about 6–9×10$^{13}$ Watt/cm$^2$ (such as produced by a KrF laser) the emitted harmonics produced have a wavelength of 2.99 and 2.92 nm corresponding to the 83d and 85th harmonics. The two following symmetry-allowed harmonics, the 167th and 169th are emitted at an extremely low intensity if at all, as described in the Appendix and in Alon et al.

From this example, an added advantage of the present invention over the prior art is seen. As discussed above, harmonic generation methods known in the prior art produces a wide range of wavelengths in the emitted beam. The harmonics appear as a plurality of frequencies. As is well known to one skilled in the art and described in the Appendix and in Alon et al., there exists a cutoff frequency above which the intensity of the generated harmonics falls-off exponentially. The cutoff frequency when a nanotube is used in the frequency multiplication medium is determined by the diameter of the nanotube as well as the frequency and the strength of the electrical field of the incident radiation. Some molecules, such as chiral nanotubes, have screw axes with very high orders. A specific such molecule can be chosen for use as constituent in a frequency multiplication medium according to the present invention along with an incident beam with an intensity within a given range of intensities in order to generate a beam with a limited frequency distribution. For example, a nanotube can be chosen having a screw axis order and a radius so that when irradiated with a beam of a given frequency with an intensity within a given range of intensities so that only the first harmonic pair has a significant intensity, thus producing a practically dichromatic beam of x-rays. Although technically more difficult, it is clear that even a monochromatic beam of x-rays can be produced in this way.

Nanotubes are also a preferred material for use in the device of the present invention on a practical level. Being large and easily manipulated molecules nanotubes can be oriented and fixed in space to make a spatially defined solid target For example, individual nanotubes may be mounted on a suitable substrate. For example, Hongjie Dai et al., "Nanotubes as nanoprobes in scanning probe microscopy", *Nature*, Vol. 384 pp. 147–150 (Nov. 14, 1996), which is incorporated by reference for all purposes as if fully set forth herein, discloses the attachment of nanotubes to a silicon substrate using an acrylic adhesive.

Many nanotubes have been mounted parallel to each other and perpendicular to a polymer substrate, as shown by de Heer et al., "Aligned carbon nanotubes films: production and optical and electronic properties", *Science*, Vol. 268 pp. 845–847 (May 12, 1995), which is incorporated by reference for all purposes as if fully set forth herein.

Arrays of nanotubes have been assembled as shown by Fan et al, "Self-Oriented Regular Arrays of Carbon Nanotubes and Their Field Emission Properties", *Science*, Vol. 283 pp. 512–514 (Jan. 22, 1999), which is incorporated by reference for all purposes as if filly set forth herein.

Bundles of parallel nanotubes have been assembled as shown by Thess et al., "Crystaffine Ropes of Metallic Carbon Nanotubes", *Science*, Vol. 273 pp. 483–487 (Jul. 26, 1996), Wildoer et al., "Electronic structure of atomically resolved carbon nanotubes", *Nature*, Vol. 391 pp. 59–62 (Jan. 1, 1998), Liu et al., "Synthesis of Macroscopically Long Ropes of Well-Aligned Single-Walled Carbon Nanotubes", *Advanced Materials*, Vol. 12, pp. 1190–1192 (August 2000) and by Lopéz et al., "Novel Polygonized Single-Wall Carbon Nanotube Bundles", *Phys. Rev. Lett.*, Vol. 86 pp. 3056–3059 (Apr. 2, 2001), which are all incorporated by reference for all purposes as if fully set forth herein.

In Lopez et al certain relatively large-diameter carbon nanotubes are reported to have the tendency to deform to have a hexagonal cross section when found within a bundle. Thus, in cases where it is desired to use a specific nanotube according to the present invention, and the specific nanotube is of type that is found to undergo such a deformation, it is preferred to use discrete nanotubes imbedded in or attached to a substrate such as a polymer rather than use a bundle of the specific nanotubes.

Launois et al., in "Carbon Nanotubes Synthesized in Chapels of AlPO$_4$-5 Single Crystals: First X-Ray Scattering Investigations" *Solid State Comm.* Vol. 116, pp. 99–103 (2000), disclose the production of nanotubes in a single zeolite crystal.

As is known to one skilled in the art, nanotubes suitable for use in manufacture of a device of the present invention are available from a plurality of manufacturers, for example Material and Electrical Research Corporation of Tucson Ariz.

Figure 2:
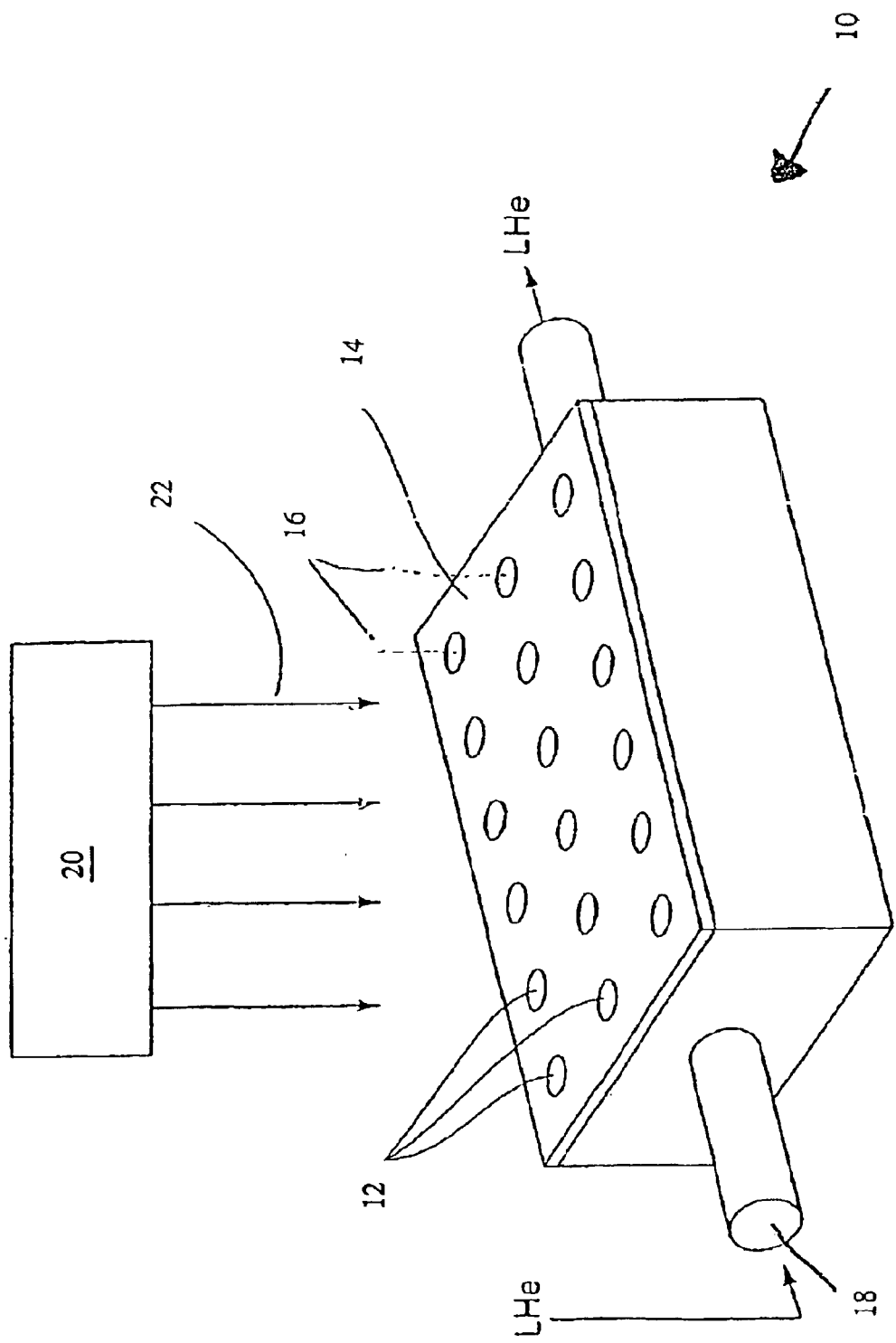
FIG. 2 is a schematic illustration of a first embodiment of the device of the present invention based on nanotubes as a constituent of a frequency multiplication medium.

FIG. 2 is a schematic illustration, partly in perspective, of a device 10 of the present invention. A plurality of (12.6)-nanotubes 12 are imbedded in and held in place by a polymer substrate 14. Nanotubes 12 are all oriented so that their screw axes 16 are parallel. Flowing around nanotubes 12 and through channel 18 in polymer substrate 14 is liquid helium to reduce thermal twisting and thermal bending of nanotubes 12. A laser device 20 directs a beam 22 of coherent, circularly polarized light towards nanotube assembly so that beam 22 is parallel to the screw axes 16 of nanotubes 12. Suitable laser devices 20 are described in the review article by L'Huiller, et al., referenced hereinabove. Methods to transform linearly polarized coherent light into circularly polarized coherent light, using beam splitters and quarter wave plates are well known in the art. Suitable quarter wave plates are available inter alia from Spindler & Hoyer GMBH & Co., Göttingen, Germany.

The interaction of beam 22 with nanotubes 12 produces higher harmonics of beam 22. Because of the very high order of screw axes 16 of nanotubes 12, the produced higher harmonics are very restricted in frequency content. Higher harmonics in the soft x-ray band emerge from the end of the nanotubes 12 opposite to laser device 20.

Figure 3:
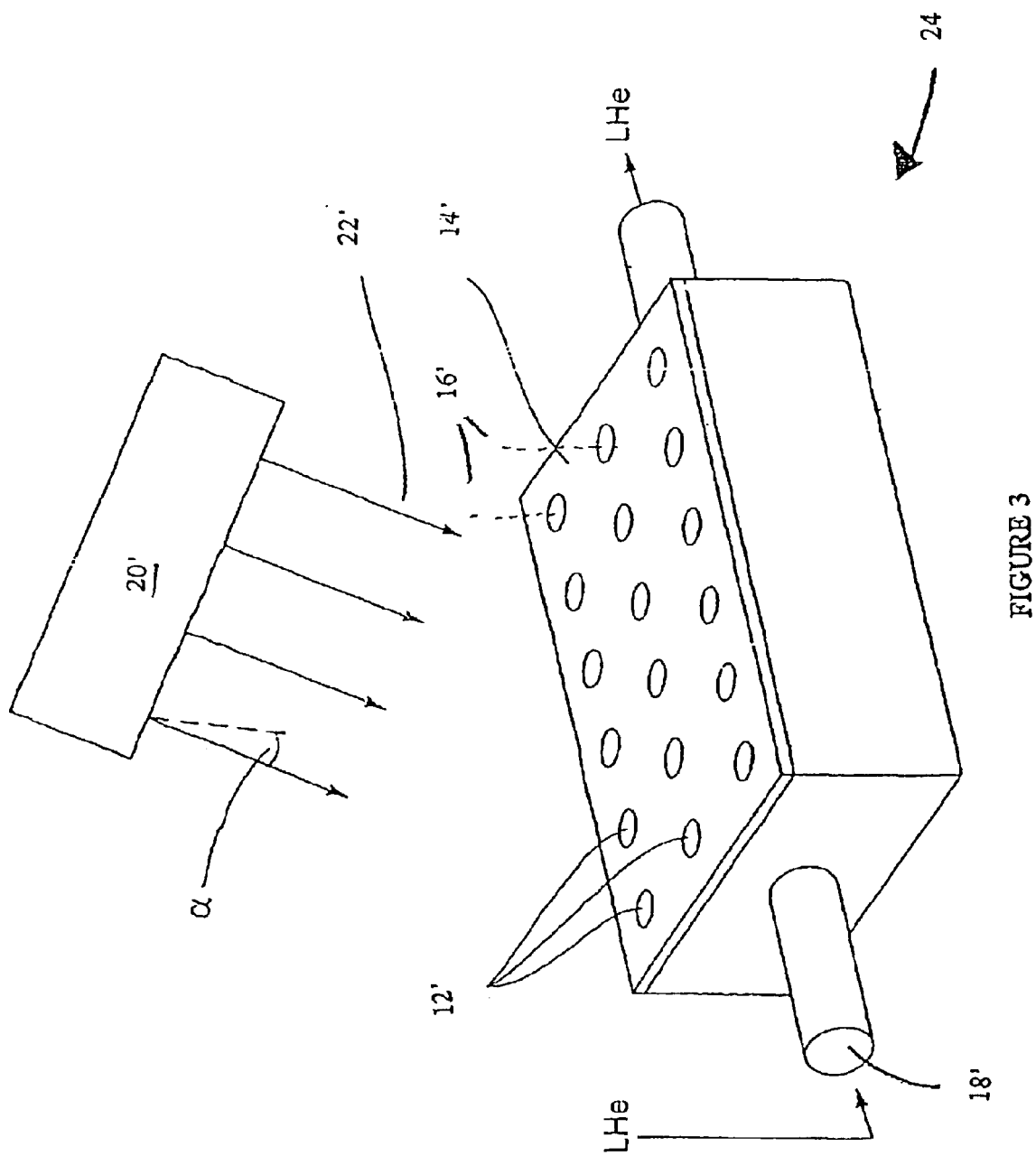
FIG. 3 is a schematic illustration of a second embodiment of the device of the present invention based on nanotubes as a constituent of a frequency multiplication medium where the incident beam is non-normal.

In another embodiment of the device of the present invention, 24, depicted in FIG. 3, a beam 22' of elliptically polarized light is projected towards nanotubes 12', at an angle α to normal incidence. Beam 22' is such that the effective electrical field thereof in a plane perpendicular to the nanotube axes is circularly polarized. Such oblique incidence is useful in case light reflected back to laser device 20' might damage laser device 20'. Although, strictly speaking, tilting beam 22' prevents beam 22' from propagating in parallel to screw axes 16' so that the selection rules described hereinabove are no longer exact, at a sufficiently small angle α the propagation of beam 22' is close enough to exact for practical purposes and substantially selective generation of high harmonics of beam 22'.

WO 99/33084 discloses a device and a method based on dipole approximations with respect to both the incident and emitted radiation. The device and the method of the present invention are based on the general and exact method for formulating the selection rules for high harmonic generation beyond that of the dipole approximations, described in the Appendix and Alon et al. Although superficially resembling the device and the method disclosed in WO 99/33084, the device and the method of the present invention are neither obvious from nor anticipated by WO 99/33084 and specifically, from the theoretical considerations presented therein.

While the invention has been described with respect to a limited number of embodiments, it will be appreciated that many variations, modifications and other applications of the invention may be made.

APPENDIX

High Harmonic Generation of X-rays by Carbon Nanotubes

Ofir E. Alon[a], Vitali Averbukh[a] and Nimrod Moiseyev [a,b]

[a] *Department of Chemistry, Technion – Israel Institute of Technology, Haifa 32000, Israel.*

[b] *Minerva Center for Non-Linear Physics of Complex Systems, Technion – Israel Institute of Technology, Haifa 32000, Israel.*

Abstract

We extend the method for the formulation of selection rules for high harmonic generation spectra [*Phys. Rev. Lett.* 80, 3743 (1998)] beyond the dipole approximation and apply it to single wall carbon nanotubes interacting with a circularly polarized laser field. Our results show that the carbon nanotubes, especially the chiral ones, can be excellent systems for a selective generation of high harmonics, up to the X-ray regime.

PACS numbers: 33.80.Wz, 42.65.Ky, 42.25.Ja, 78.90.+t

There is a very limited number of possibilities by which one can obtain coherent X-ray [1]. The interest in short-wavelength sources stimulated numerous experimental investigations of harmonic generation spectra of noble gases in intense linearly polarized laser field (see [2] and references therein). The recent experimental successes in the field [3,4] emphasize the possibility of application of high harmonics in spectroscopy and other areas. On property which would have made the harmonic radiation particularly useful is the selectivity of the generation of high harmonics. In order to achieve a selective generation of high harmonics, one has to devise a system possessing a very high order spatio-temporal symmetry [5]. To the best of our knowledge, such systems cannot be found among the planar molecule discussed in Ref. [5]. Here we show that the interaction of nanotubes and circularly polarized incident radiation is characterized by such kind of symmetry and can lead to the generation of harmonics of the order higher than 100 in a selective fashion. Thus, already the first high harmonic emitted by a nanotube can fall within the desired (soft X-ray or X-ray) range.

The approach to the formulation of the selection rules developed by us previously [5] for the description of planar systems is based on the dipole approximations with respect to both the incident and the emitted waves and is not valid for the spatially extended target systems, such as nanotubes. In fact, the dipole approximations can be misleading even in the case of atomic targets sufficiently distorted by the incident fields. For example, an exact symmetry analysis shows that the selection rules for the harmonic generation in the crossed beam setup proposed recently by Tong and Chu [6] are only approximate. Therefore, let us first present a general and exact method for the formulation of the selection rules for high harmonic generation and then proceed with applying it to the harmonic generation by single wall carbon nanotubes.

High harmonic generation (HHG) is a process in the course of which a target (e.g. atomic or molecular) system emits high harmonics of the incident laser frequency. According to classical electrodynamics, the intensity of l-th harmonics, $I(l\omega)$, in HHG spectra is associated with the corresponding Fourier component of the time-dependent electron flux, $\vec{J}(\vec{r},t)$, [7]:

$$I(l\omega) \propto \left|\vec{A}_l \times \vec{k}\right|^2, \quad \vec{A}_l \propto \int_0^\infty dt \int_{-\infty}^\infty d^3r \, \vec{J}(\vec{r},t) e^{-i(l\omega t - \vec{k}\cdot\vec{r})}, \quad (1)$$

where $\omega$ is the incident radiation frequency and $\vec{k}$ is the harmonic wave vector. Note that in the Eq. (1) $\vec{A}_l$ stands for the (immeasurable) vector potential of the emitted field of the frequency $l\omega$. The (measurable) magnetic and electric fields propagating along the direction of the wave vector $\vec{k}$ are obtained from $\vec{A}_l$ by vector multiplication: $\vec{H}_l = i\vec{A}_l \times \vec{k}$, $\vec{E}_l = \frac{ic}{l\omega}\vec{k} \times (\vec{A}_l \times \vec{k})$.

When dealing with micro- or meso-scopic systems behaving according to the laws of quantum mechanics, one has to use the quantum mechanical expression for the flux [8] $J(\vec{r},t) = Re(\Psi^* \vec{v} \Psi)$, where $\vec{v}$ is the electron velocity operator. The most appropriate choice for the wave function, $\Psi$, when regarding the symmetries of the system in space and time is Floquet wave function [9,5], which is periodic in time apart from a phase factor. Its time-periodic part, $\Phi(\vec{r},t)$, is an eigenfunction of Floquet Hamiltonian:

$$\hat{\mathcal{H}} = \frac{\hbar}{i}\frac{\partial}{\partial t} + \frac{(\vec{p} - e\vec{A}(\vec{r},t))^2}{2m} + V(\vec{r}) \quad (2)$$
$$\hat{\mathcal{H}}\Phi(\vec{r},t) = \varepsilon \Phi(\vec{r},t)$$

The vector potential $A(\vec{r},t)$ for the incident plane wave propagating along z-axis is:

$$\vec{A}(\vec{r},t) = \frac{E_0}{\omega}\left(\cos(\omega t - kz), \alpha \sin(\omega t - kz), 0\right), \quad (3)$$

where $E_0$ is the incident field strength, the wave vector $\vec{k} = (0,0,k)$ and $\alpha$ is equal to zero and $\pm 1$ for linear and right or left circular polarizations, respectively.

Floquet theory can be applied if the incident radiation pulse is many optical cycles long [10]. The Floquet expression for the vector potential of the l-th harmonic emitted in the incident field propagation direction is:

$$\vec{A}_l \propto \left\langle\!\left\langle \Psi(\vec{r},t)|\tilde{\vec{A}}_l|\Psi(\vec{r},t)\right\rangle\!\right\rangle + \left\langle\!\left\langle \Psi^*(\vec{r},t)|\tilde{\vec{A}}_l^*|\Psi^*(\vec{r},t)\right\rangle\!\right\rangle$$
$$\tilde{\vec{A}}_l = \vec{v} e^{-il(\omega t - kz)} \quad \tilde{\vec{A}}_l^* = \vec{v}^* e^{-il(\omega t - kz)}, \quad (4)$$

where $\vec{v} = \frac{1}{m}(\vec{p} - e\vec{A}(\vec{r},t))$ is the electron velocity operator and the double bra-ket notation, $\langle\!\langle \ldots \rangle\!\rangle$, stands for the integration over spatial coordinates and over one field period in time.

Note that the expression (4) is not based on the dipole approximation with respect to either incident or emitted wave. Taking into account the spatial dependence of the waves enables us to study the HHG by targets extended along the propagation direction of the radiation In order to discuss the selectivity of HHG quantitatively, one has to derive the selection rules for the spectrum of the emitted photons with energies equal to $l\hbar\omega$, $l = 1, 2, \ldots$. The selection rules can be found in the following way. First, one has to find all the symmetry operations of the time-dependent Hamiltonian (2). Such symmetries will be most likely associated with transformations in space *and* time and will be referred to as dynamical symmetries (DS's). If all the DS operators commute with each other, it is enough to verify the invariance of the vector potential operators, $\bar{A}_l$ (Eq. 4), under all the DS operations. Only those harmonics for which at least *one* of the vector potential operators, $\bar{A}_l$, is invariant under *all* the DS operations, will be present in the HHG spectrum. The higher is the order of the DS present in the system, the more selective HHG is. In the following we will show that the interaction of a single wall carbon nanotube with a circularly polarized laser field can be characterized by DS of a very high order.

Carbon nanotubes are a recently synthesized allotropic form of carbon (see Ref. [11] for a review of their physical properties). Single wall carbon nanotubes, to which we will restrict our attention, can be viewed as cylinders made of graphite sheets (see Fig.A). The infinite order translational symmetries of the graphite lattice can transform into various finite order symmetries once the graphite sheet plane is transformed into the nanotube cylinder. The order and character of the resulting symmetries depend on the way the graphite sheet boundaries are connected with each other to form the cylinder. In Fig.A the classification according to the pair of indices, $(n, m)$, representing different carbon nanotubes, is illustrated. The $(n, m)$-carbon nanotube is formed by rolling the graphite sheet along the chiral vector $\vec{C}_h = n\vec{a}_1 + m\vec{a}_2$, such that its origin, $O$, and its end point, $O'$, coincide in the nanotube. If the graphite sheet is rolled along the $n\vec{a}_1$ direction then an achiral zigzag-type nanotube classified by the pair of indices $(n, 0)$ is formed. If the graphite sheet is rolled along the $n(\vec{a}_1 + \vec{a}_2)$ direction then an achiral armchair-type nanotube classified by the pair of indices $(n, n)$ is formed. In all other cases, i.e. whenever $0 < m < n$, a chiral nanotube formed.

The two basic symmetry operations for a general nanotube can be taken as a revolutic about the highest-order screw axis and the translation. Expressed in cylindrical coordinates they are:

$$S_{N,R} = (\varphi \to \varphi + \psi, \ z \to z + \tau) \tag{5}$$

and $$T_\infty = (z \to z + z_0), \tag{6}$$

where the screw axis parameters ($\psi$, the chiral rotation angle, $\tau$, the screw axis basic translation, $N$, the order of the screw axis which is equal to the number of hexagonal units in a unit cell and $R$, the number of rotations around the nanotube axis after $N$ successive operations) and the chiral nanotube period, $z_0$, are functions of its indices, $(n, m)$ (for their dependencies see, e.g., Ref. [11]).

Consider, for example, the chiral nanotube with indices $(8, 3)$ (see Fig. 2). In this case $\psi = \frac{71}{194}2\pi$, $\tau = \frac{1}{194}z_0$. Therefore, after $N = 194$ successive operations of $S_{194,71}$, a genera point, $Q$, on the nanotube perimeter is transformed to an equivalent point, $Q'$, at a distance $z_0$ from $Q$, after having completed 71 rotations around the nanotube axis.

Recently, Slepyan et al. [12] have predicted that the HHG by armchair nanotubes interacting with an intense radiation polarized along the nanotube axes is a highly efficient process. In this work we would like to concentrate on HHG due to the interaction of genera nanotubes with an electromagnetic field propagating along the nanotube axes and polarized circularly in the perpendicular plane. The reason is that this mode of interaction brings about the highest order DS's. The corresponding Floquet Hamiltonian (Eq. (2)), possesses the following DS's:

$$\hat{P}_{N,R} = \left(\varphi \to \varphi + \psi, \ z \to z + \tau, \ t \to t + \frac{k\tau}{\omega} + \alpha\frac{\psi}{\omega}\right) \tag{7}$$

and $$\hat{P}_\infty = \left(z \to z + z_0,\ t \to t + \frac{kz_0}{\omega}\right) \qquad (8)$$

Eqs. (7,8), are just the spatial transformations dictated by the symmetry of the nanotube potential, Eqs. (5,6), and compensated by the appropriate translations in time. The order of $\hat{P}_{N,R}$ symmetry operation is equal to $N$ for both left and right circular polarizations, i.e it is the same for $\alpha = 1$ and $\alpha = -1$. The symmetries (Eqs. (7,8)) correspond, of course to the fixed positions of nuclei. In the following it is assumed that the carbon nuclei do not change their positions during the interaction with the laser pulse and regard them as frozen in their field-free equilibrium positions.

In order to determine which harmonics are emitted by nanotubes during the interaction with circularly polarized radiation, it is sufficient to check the invariance of the $\hat{A}_{l,\pm} = \hat{A}_{l,x} \pm i\hat{A}_{l,y}$ operators, (see Eq. (4)), under the above two DS's. It turns out that the $\hat{A}_{l,\pm}$ operators are invariant under $\hat{P}_\infty$ for any harmonic order $n$. The $\hat{P}_{N,R}$ DS operation, on the other hand, leaves invariant the vector potential operators only for those harmonics with $l = 1,\ N \pm 1,\ 2N \pm 1, \ldots, pN \pm 1, \ldots$. The $(pN + 1)$, $p = 1, 2, \ldots$ harmonics are circularly polarized as the incident field, while the $(pN - 1)$, $p = 1, 2, \ldots$ harmonics are circularly polarized in the opposite direction.

The order of the screw axis, $N$, of an achiral nanotube is equal to twice the order of its rotation axis, $n$. Consequently, the selection rule for HHG by achiral nanotubes is $l = 2pn \pm 1$. For example, the $(10,0)$ zigzag-type nanotube and the $(10,10)$ armchair-type nanotube emit only the 19-th, 21-st, 39-th, 41-st, ... harmonics of the incident laser frequency. For such a value of $N$ and incident radiation wavelength of 200 nm the first emitted harmonic wavelength, $\lambda_{19}$ is about 10.5 nm.

The chiral nanotubes can possess the screw axes of much higher orders than the achiral ones, which leads to a much more selective HHG by these systems. For example, for the chiral $(8,3)$ single wall carbon nanotube the $(pN \pm 1)$ selection rule implies that the first emitted harmonics are the 193-rd and 195-th. In such a case, the wavelength of the first harmonic, generated by a circularly polarized 200 nm incident radiation, is about 1 nm.

Single wall carbon nanotubes appear to be a unique class of systems for the selectiv HHG in the soft X-ray and X-ray regimes. The chiral nanotubes represent the first exampl of a realistic physical system giving rise to a HHG spectrum in which all harmonics bu very high ones are forbidden by symmetry. Moreover, from a practical point of view, the nanotube targets lack a number of serious drawbacks characteristic of the molecular ones Unlike molecules, the nanotubes can be oriented in space just as solid targets. Arrays o nanotubes parallel to each other can be achieved by present day methods [13]. Efforts are being made to prepare the ropes containing nanotubes of a single definite symmetry [14] The chemical bonding between carbon atoms in nanotubes is rather strong which means that their deformation and dissociation in intense fields take place on longer time scales than that of aromatic molecules. The lack of light hydrogen atoms in nanotubes contributes to the same stability effect.

Our discussion of the selectivity of HHG by single wall carbon nanotubes has been limited so far to the formulation of the selection rules. An important question arises, however, what are the intensities of the symmetry-allowed harmonics emitted by these systems. The theoretical analysis of HHG concentrates on the calculation of the relative intensities of high harmonics. The conversion efficiencies from the incident laser frequency to the harmonic modes are of the order of $10^{-6}$ in the best HHG experiments in the gas phase [4]. The most important parameter characterizing the relative intensities of various harmonics is the cutoff frequency above which the HHG spectrum dies off exponentially. Regarding the selective HHG, if the cutoff frequency is higher than that of the first symmetry-allowed harmonic, then the harmonic intensity is expected to be sufficient at least for its observation. Let us obtain a rough estimation of the position of the cutoff of HHG by single wall carbon nanotubes. To this end we neglect the insignificant magnetic component of the incident field and describe the process of HHG as an interaction of the $\pi$-electrons of a tube with the electric field $\vec{E}(z,t)$ driving them around the tube axis ($z$) and with the carbon nuclei screened by the inner electrons. In the language of quantum mechanics the motion of an electron can be described in terms of transitions between the bound states of the tube and from its bound to its continuum states and back. One can show that the contribution of the bound-continuum transitions is negligible because, classically speaking, the trajectorie of the ionized electrons do not return to the vicinity of the tube after ionization [15]. Th bound - bound contribution can be described as a transfer of the interaction energy int the energy of the emitted field [15]. The variation of the energy of interaction with th electric field, $E_{int} = e\vec{E}(z,t) \cdot \vec{r}$, is of the order of magnitude of the nanotube diamete times the electric field strength. At the electric field of the strength of 0.1 a.u. (or intensit of $3.51 \times 10^{14}$ W/cm$^2$) and the nanotube diameter of 15 a.u. the cutoff position would be roughly at the energy of 1.5 a.u. or about 40 eV. Such cutoff energy is sufficient to reveal the symmetry-allowed harmonics emitted by the achiral nanotubes at the incident frequency of the order of 1 eV. The above arguments imply that in order to study the selective harmonic emission from the chiral nanotubes one would have to use higher incident field strengths, up to 1 a.u. (or intensity of $3.51 \times 10^{16}$ W/cm$^2$).

In conclusion, the interaction of a parallel nanotube array with a circularly polarized laser beam can lead to the generation of the first high harmonic in the soft X-ray or X-ray range. The developed general framework for the formulation of the selection rules for HHG beyond the dipole approximation can be applied to a the study of selectivity of HHG by other systems which are extended along the incident beam propagation direction and emit low wavelength radiation.

Besides the potential significance for the generation of the coherent, almost monochromatic high frequency radiation, the selective HHG by carbon nanotubes can be used for the structural analysis of the nanotube samples. The relative strengths of the harmonics allowed for different nanotubes can provide an information about the relative abundances of the various symmetry species in a nanotube sample. This information would be of a great value given that other means of analysis, such as STM, do not allow at present an unambiguous determination of the nanotube indices.

ACKNOWLEDGMENTS

The authors would like to thank one of the referees for pointing out the possible analytical applications of the derived selection rules. This work is supported in part by the Israel-US BSF, by the Basic Research Foundation administered by the Israeli Academy of Sciences and Humanities and by the Fund for the Promotion of Research at Technion.

REFERENCES

[1] Svanberg, S., L'Huillier, A. & Wahlström, C.-G., Nucl. Instr. and Meth. in Phys. Res. A 398, 55 (1997).

[2] Salières, P., L'Huillier, A., Antoine, P. & Lewenstein, M., Adv. in At., Mol., and Opt Phys. 4, 83 (1999).

[3] Schnürer, M. et al., Phys. Rev. Lett. 80, 3236 (1998).

[4] Rundquist, A. et al., Science 280, 1412 (1998); Tamaki, Y. et al., Phys. Rev. Lett. 82 1422 (1999); Constant, E., et al., Phys. Rev. Lett. 82, 1668 (1999).

[5] Alon, O. E., Averbukh, V. & Moiseyev, N., Phys. Rev. Lett. 80, 3743 (1998).

[6] Chu, S.-I., Tong X.-M., Phys. Rev. A 58, R2656 (1998); Averbukh, V., Alon, O. & Moiseyev, N., Phys. Rev. A 60, 2585 (1999).

[7] Landau, L. D. & Lifschitz, E. M., *Classical Theory of Fields, 3rd edition*, (Pergamon, Oxford, 1971).

[8] Schiff, L. I., *Quantum Mechanics, 3rd edition* (McGraw-Hill, Singapore, 1987).

[9] Ben-Tal, N., Beswick, R. & Moiseyev, N., J. Phys. B 26, 3017 (1993).

[10] Moiseyev, N. & Weinhold, F., Phys. Rev. Lett. 78, 2100 (1997).

[11] Saito, R., Dresselhaus, G. & Dresselhaus, M. S., *Physical Properties of Carbon Nanotubes* (Imperial College Press, London, 1998).

[12] Slepyan, G. Ya. et al., Phys. Rev. A 60, R777 (1999).

[13] Fan, S. et al., Science 283, 512 (1999).

[14] Thess, A. et al., Science 273, 483 (1996); Wildoer, W. G. et al., Nature 391, 59 (1998).

[15] Averbukh, V., Alon, O. E. & Moiseyev, N., To be submitted to Phys. Rev. A.

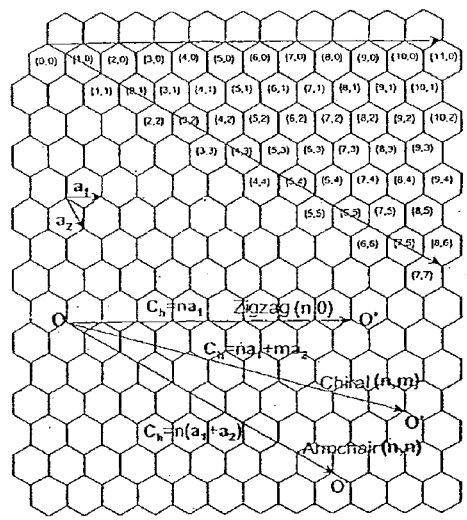
FIG. 1. Classification of carbon nanotubes according to the pair of indices, $(n, m)$. $\vec{a}_1$ and $\vec{a}_2$ are the two primitive vectors of the honeycomb lattice. The chiral vectors, $C_h = OO'$, are shown for a zigzag, a chiral and an armchair nanotubes.

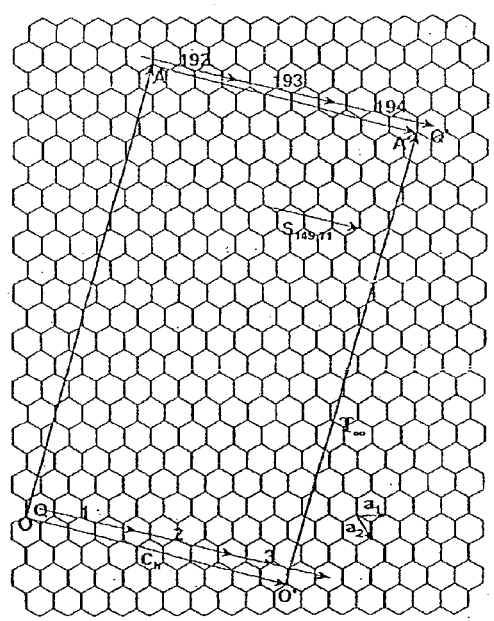
FIG. 82. Unit cell, OO'A'A, of (8,3) chiral nanotube. Two basic symmetry operations, $T_\infty$ and $S_{194,71}$ are shown.

What is claimed is:

1. A device for producing high frequency radiation, comprising:
   (a) a source of elliptically polarized radiation; and
   (b) a frequency multiplication medium including at least one constituent having approximate finite symmetry including a screw axis of approximate Nth order symmetry, wherein N is at least 2, wherein said at least one constituent is oriented so that said elliptically polarized radiation propagates substantially parallel to said screw axis.

2. The device of claim 1 wherein said source includes a laser.

3. The device of claim 1 wherein said elliptically polarized radiation includes an electrical field that is circularly polarized in a plane substantially perpendicular to said screw axis.

4. The device of claim 1 wherein said radiation is circularly polarized.

5. The device of claim 1 wherein said at least one constituent is a nanotube.

6. The device of claim 5 wherein said nanotube is single walled.

7. The device of claim 1 wherein said at least one constituent is a bundle of nanotubes.

8. The device of claim 1, wherein said medium includes a plurality of said constituents.

9. The device of claim 1 further comprising;
   (c) a mechanism for cooling said at least one constituent.

10. The device of claim 9, wherein said mechanism includes a cryogenic liquid.

11. The device of claim 1 further comprising:
    (c) a mechanism for maintaining said orientation of said at least one constituent.

12. The device of claim 1, wherein said at least one constituent is at least two constituents, and further comprising:
    (c) a mechanism for maintaining said at least two constituents in a common said orientation.

13. The device of claim 12, wherein said at least two constituents include nanotubes and wherein said mechanism includes a substrate to which said constituents are attached.

14. The device of claim 13 wherein said substrate is substantially planar.

15. The device of claim 13 wherein said substrate includes a polymer material.

16. The device of claim 13 wherein said substrate includes a crystalline material.

17. The device of claim 16 wherein said crystalline material is a zeolite.

18. The device of claim 13 wherein said attachment includes the use of an adhesive.

19. A method of producing high frequency radiation, comprising:
    (a) providing a frequency multiplication medium including at least one constituent having approximate finite symmetry including a screw axis of approximate Nth order symmetry, wherein N is at least 2; and
    (b) directing elliptically polarized radiation at an angle to said axis such that said elliptically polarized radiation propagates substantially parallel to said screw axis.

20. The method of claim 19 wherein said elliptically polarized radiation includes an electrical field that is circularly polarized in a plane substantially perpendicular to said screw axis.

21. The method of claim 19, wherein said at least one constituent is a nanotube.

22. The method of claim 21 wherein said nanotube is single walled.

23. The method of claim 19, further comprising:
    (c) cooling said at least one constituent.

24. The method of claim 19, wherein said medium includes a plurality of said constituents, the method further comprising the step of:
    (c) imposing a common orientation on said constituents.

25. The method of claim 19, wherein said elliptically polarized electromagnetic radiation is circularly polarized.

26. A device for producing high frequency radiation, comprising:
    (a) a source of elliptically polarized radiation; and
    (b) a frequency multiplication medium including at least one constituent having approximate finite symmetry including a screw axis of approximate Nth order symmetry, wherein N is at least 2 and also including an axis of approximate $C_n$ symmetry, wherein n is at least 3, wherein said at least one constituent is oriented so that said elliptically polarized radiation propagates substantially parallel to said screw axis.

27. The device of claim 26 wherein said source includes a laser.

28. The device of claim 26 wherein said elliptically polarized radiation includes an electrical field that is circularly polarized in a plane substantially perpendicular to said screw axis.

29. The device of claim 26 wherein said radiation is circularly polarized.

30. The device of claim 26 wherein said at least one constituent is a nanotube.

31. The device of claim 30 wherein said nanotube is single walled.

32. The device of claim 26 wherein said at least one constituent is a bundle of nanotubes.

33. The device of claim 26, wherein said medium includes a plurality of said constituents.

34. The device of claim 26 further comprising;
    (c) a mechanism for cooling said at least one constituent.

35. The device of claim 34, wherein said mechanism includes a cryogenic liquid.

36. The device of claim 26 farther comprising:
    (c) a mechanism for maintaining said orientation of said at least one constituent.

37. The device of claim 26, wherein said at least one constituent is at least two constituents, and farther comprising:
    (c) a mechanism for maintaining said at least two constituents in a common said orientation.

38. The device of claim 37, wherein said at least two constituents include nanotubes and wherein said mechanism includes a substrate to which said constituents are attached.

39. The device of claim 38 wherein said substrate is substantially planar.

40. The device of claim 38 wherein said substrate includes a polymer material.

41. The device of claim 38 wherein said substrate includes a crystalline material.

42. The device of claim 41 wherein said crystalline material is a zeolite.

43. The device of claim 38 wherein said attachment includes the use of an adhesive.

44. A method of producing high frequency radiation, comprising:
    (a) providing a frequency multiplication medium including at least one constituent having approximate finite symmetry including a screw axis of approximate Nth order symmetry, wherein N is at least 2 and also including an axis of approximate $C_n$ symmetry, wherein n is at least 3; and (b) directing elliptically polarized radiation at an angle to said axis such that said elliptically polarized radiation propagates substantially parallel to said screw axis.

45. The method of claim 44 wherein said elliptically polarized radiation includes an electrical field that is circularly polarized in a plane substantially perpendicular to said screw axis.

46. The method of claim 44, wherein said at least one constituent is a nanotube.

47. The device of claim 46 wherein said nanotube is single walled.

48. The method of claim 44, further comprising:
(c) cooling said at least one constituent.

49. The method of claim 44, wherein said medium includes a plurality of said constituents, the method further comprising the step of:
(c) imposing a common orientation on said constituents.

50. The method of claim 44, wherein said elliptically polarized electromagnetic radiation is circularly polarized.

51. A method of producing a beam of high frequency radiation composed of a limited number of wavelengths, comprising:
a) providing a frequency multiplication medium including at least one constituent having approximate finite symmetry including a screw axis of approximate Nth order symmetry, wherein N is at least 2; and
b) directing elliptically polarized radiation at an angle to said axis such that said elliptically polarized radiation propagates substantially parallel to said screw axis, said radiation having an intensity sufficiently low to produce only the radiation of the limited number of wavelengths.

52. The method of claim 51 wherein radiation emitted by a radiation source is attenuated to achieve said intensity of said elliptically polarized radiation.

53. The method of claim 51 wherein said radiation source is a laser.

54. The method of claim 51 wherein said constituent is a nanotube.

55. The method of claim 54 wherein said nanotube is single walled.

56. The method of claim 51 wherein said elliptically polarized radiation includes an electrical field that is circularly polarized in a plane substantially perpendicular to said screw axis.

57. The method of claim 51, wherein said elliptically polarized electromagnetic radiation is circularly polarized.

58. The method of claim 51, wherein said medium includes a plurality of said constituents, the method further comprising the step of:
(c) imposing a common orientation on said constituents.

* * * * *